US012651107B2

(12) United States Patent　(10) Patent No.:　US 12,651,107 B2

Cardwell et al.　(45) Date of Patent:　Jun. 9, 2026

(54) AI-ENHANCED CODESIGN FOR CIRCUIT AND SYSTEM DESIGN

(71) Applicant: National Technology & Engineering Solutions of Sandia, LLC, Albuquerque, NM (US)

(72) Inventors: Suma George Cardwell, Albuquerque, NM (US); John Darby Smith, Albuquerque, NM (US); Douglas Cale Crowder, Albuquerque, NM (US); Frances S. Chance, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 601 days.

(21) Appl. No.: 18/215,219

(22) Filed: Jun. 28, 2023

(65) Prior Publication Data

US 2025/0005245 A1　　Jan. 2, 2025

(51) Int. Cl.
　*G06F 30/337*　　(2020.01)
　*G06F 30/27*　　(2020.01)
　　　　(Continued)

(52) U.S. Cl.
　CPC .......... *G06F 30/337* (2020.01); *G06F 30/327* (2020.01); *G06F 30/27* (2020.01);
　　　　(Continued)

(58) Field of Classification Search
　CPC .... G06F 30/337; G06F 30/327; G06F 30/373; G06F 30/392; G06F 30/27;
　　　　(Continued)

(56) References Cited

U.S. PATENT DOCUMENTS

| | | | | | |
|---|---|---|---|---|---|
| 5,103,421 | A | * | 4/1992 | Ward | G06F 30/00 |
| 5,245,695 | A | * | 9/1993 | Basehore | G06N 7/04 |
| | | | | | 706/900 |

(Continued)

FOREIGN PATENT DOCUMENTS

| | | | | | |
|---|---|---|---|---|---|
| GB | 2438555 | A | * | 11/2007 | G06F 30/20 |
| WO | WO-9848364 | A1 | * | 10/1998 | G06F 30/00 |
| WO | WO-9966432 | A1 | * | 11/2007 | G06F 30/30 |
| WO | WO-2023022705 | A1 | * | 2/2023 | G06F 30/27 |

OTHER PUBLICATIONS

Fitzgerald, "Synthesizing Loop-Free Programs with Rust and Z3", https://fitzgen.com/2020/01/13/synthesizing-loop-free-programs. html, Jan. 13, 2020, 79 pages. (Year: 2020).*

*Primary Examiner* — Phallaka Kik

(74) *Attorney, Agent, or Firm* — Yee & Associates, P.C.; Gregory M. Doudnikofff; Merle W. Richman

(57)　　　ABSTRACT

Automated circuit design is provided. The method comprises mapping a number of inputs to a number of desired outputs and receiving a number of specified constraints. A number of component specifications are determined for circuit components necessary to achieve the desired outputs from the inputs within the specified constraints. A number of circuit components are chosen based on the component specifications to optimize achievement of the desired outputs from the inputs within the specified constraints, the chosen circuit components are arranged in a number of circuits based the component specifications to optimize achievement of the desired outputs.

30 Claims, 11 Drawing Sheets

(51) Int. Cl.

| | |
|---|---|
| *G06F 30/327* | (2020.01) |
| *G06F 30/373* | (2020.01) |
| *G06F 30/392* | (2020.01) |
| *G06N 3/02* | (2006.01) |
| *G06N 3/08* | (2023.01) |
| *G06N 20/00* | (2019.01) |
| *G06F 111/02* | (2020.01) |
| *G06F 111/04* | (2020.01) |
| *G06F 111/20* | (2020.01) |

(52) U.S. Cl.
CPC .......... *G06F 30/373* (2020.01); *G06F 30/392* (2020.01); *G06F 2111/02* (2020.01); *G06F 2111/04* (2020.01); *G06F 2111/20* (2020.01); *G06N 3/02* (2013.01); *G06N 3/08* (2013.01); *G06N 20/00* (2019.01)

(58) Field of Classification Search
CPC ............. G06F 2111/04; G06F 2111/02; G06F 2111/20; G06N 3/02; G06N 3/08; G06N 20/00
USPC ....... 716/104, 122, 132; 703/15; 706/12, 13, 706/33, 46
See application file for complete search history.

(56) References Cited

U.S. PATENT DOCUMENTS

| | | | | |
|---|---|---|---|---|
| 6,560,761 | B1 * | 5/2003 | Yu | ......................... G06F 30/392 716/113 |
| 10,430,547 | B2 * | 10/2019 | Gentillet | ............. G06F 16/2455 |
| 12,045,839 | B1 * | 7/2024 | Mishra | ............... G06Q 30/0254 |
| 12,387,025 | B1 * | 8/2025 | Adams | ................. G06F 30/337 |
| 2003/0093765 | A1 * | 5/2003 | Lam | ........................ G06F 30/30 716/108 |
| 2006/0064656 | A1 * | 3/2006 | Lakshmanan | ......... G06F 30/398 716/112 |
| 2006/0229753 | A1 * | 10/2006 | Seskin | .................... G06F 30/20 700/97 |
| 2010/0146469 | A1 * | 6/2010 | Chowdhury | .......... G06F 30/327 716/113 |
| 2011/0055521 | A1 * | 3/2011 | Pozzi | .................... G06F 9/3875 712/E9.023 |
| 2017/0153871 | A1 * | 6/2017 | Lee | ........................ G06F 30/30 |
| 2017/0324429 | A1 * | 11/2017 | Von Kirchbauer | .......................... H03M 13/1108 |
| 2019/0213299 | A1 * | 7/2019 | Gentillet | ............... G06F 30/392 |
| 2021/0342791 | A1 * | 11/2021 | Akrotirianakis | ....... G06Q 10/06 |
| 2023/0144285 | A1 * | 5/2023 | Timmireddy | ......... G06F 30/327 716/102 |
| 2024/0004645 | A1 * | 1/2024 | Blagodurov | ............. G06N 3/02 |
| 2024/0118668 | A1 * | 4/2024 | Wu | ........................ G05B 15/02 |

* cited by examiner

AI-ENHANCED CODESIGN FOR CIRCUIT AND SYSTEM DESIGN

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to circuit design. Specifically, the disclosure related to designing circuits and system architectures using machine learning.

2. Description of the Related Art

Novel approaches to computational architectures, hardware and algorithms are needed for development of next-generation computing systems to address the national security needs of the near future. An AI-enhanced approach has the potential to accelerate the design discovery process for neuromorphic circuits, systems, and architectures.

Neuromorphic computing platforms rely upon compact neuron models that lend themselves to extreme scalability. However, as seen in nature, relatively few complex neurons can implement complex computations. Different approaches to neuromorphic computing entail different advantages and disadvantages. For example, despite simple neuron models, digital neuromorphic computing has advantages in ease of scaling, noise resistance, and low bandwidth through spiking communication. As another example, analog/mixed-signal neuromorphic computing has the advantages of very low power requirements, complex neurons, and analog spikes, but it has disadvantages regarding scaling and calibration of noisy devices. As another example, Beyond CMOS devices feature extremely low power and scale well but require integration with conventional digital and are noisy devices.

Therefore, it would be desirable to have a method and apparatus that take into account at least some of the issues discussed above, as well as other possible issues.

SUMMARY

An illustrative embodiment provides a computer-implemented method of automated circuit design. The method comprises mapping a number of inputs to a number of desired outputs and receiving a number of specified constraints. A number of component specifications are determined for circuit components necessary to achieve the desired outputs from the inputs within the specified constraints. A number of circuit components are chosen based on the component specifications to optimize achievement of the desired outputs from the inputs within the specified constraints, the chosen circuit components are arranged in a number of circuits based the component specifications to optimize achievement of the desired outputs.

An illustrative embodiment provides a system for automated circuit design. The system comprises a storage device that stores program instructions and one or more processors operably connected to the storage device and configured to execute the program instructions to cause the system to: map a number of inputs to a number of desired outputs; receive a number of specified constraints; determine a number of component specifications for circuit components necessary to achieve the desired outputs from the inputs within the specified constraints; choose a number of circuit components based on the component specifications to optimize achievement of the desired outputs from the inputs within the specified constraints; and arrange the chosen circuit components in a number of circuits based the component specifications to optimize achievement of the desired outputs.

An illustrative embodiment provides a computer program product for automated circuit design. The computer program product comprises a computer-readable storage medium having program instructions embodied thereon to perform the steps of: mapping a number of inputs to a number of desired outputs; receiving a number of specified constraints; determining a number of component specifications for circuit components necessary to achieve the desired outputs from the inputs within the specified constraints; choosing a number of circuit components based on the component specifications to optimize achievement of the desired outputs from the inputs within the specified constraints; and arranging the chosen circuit components in a number of circuits based the component specifications to optimize achievement of the desired outputs.

The features and functions can be achieved independently in various examples of the present disclosure or may be combined in yet other examples in which further details can be seen with reference to the following description and drawings.

DETAILED DESCRIPTION

The illustrative embodiments recognize and take into account that neuromorphic computing platforms rely upon compact neuron models that lend themselves to extreme scalability. The illustrative embodiments further recognize and take into account that, as seen in nature, fewer complex neurons can implement complex computations.

The illustrative embodiments also recognize and take into account that different approaches to neuromorphic computing entail different advantages and disadvantages. For example, through the use of simple neuron models, digital neuromorphic computing has advantages in ease of scaling, noise resistance, and low bandwidth through spiking communication. As another example, analog/mixed-signal neuromorphic computing has the advantages of very low power requirements, complex neurons, and analog spikes, but it has disadvantages regarding scaling and calibration of noisy devices. As another example, Beyond CMOS devices feature extremely low power and scale well but require integration with conventional digital. Beyond CMOS devices are also noisy and need careful programming and calibration. Novel algorithms are trying to exploit these properties, though, by treating noise as a feature instead of a bug given that neurons in the brain are noisy too.

The illustrative embodiments also recognize and take into account that developing spiking circuits is a non-trivial problem given varying encoding and decoding schemes, neuron types, etc. The illustrative embodiments also recognize and take into account that artificial intelligence-enhanced tools can accelerate the design process.

The illustrative embodiments also recognize and take into account that game theory can narrow the scope of the design space. Game theory can be used to play a mathematical collaborative or competitive game among many players or a single player game. Results of such games can be used to either reduce the scope of design by limiting eligible components or to create or optimize designs based on specified criteria.

The illustrative embodiments provide an artificial intelligence-enhanced codesign approach to develop novel circuits and systems. The illustrative embodiments are capable of automatically building circuits and systems from lower level components and modules, which are chosen from a library of available components. The method automatically optimizes component parameters. If the system is unable to identify a suitable component, it will attempt to build a new component or module from basic elements.

Figure 1:
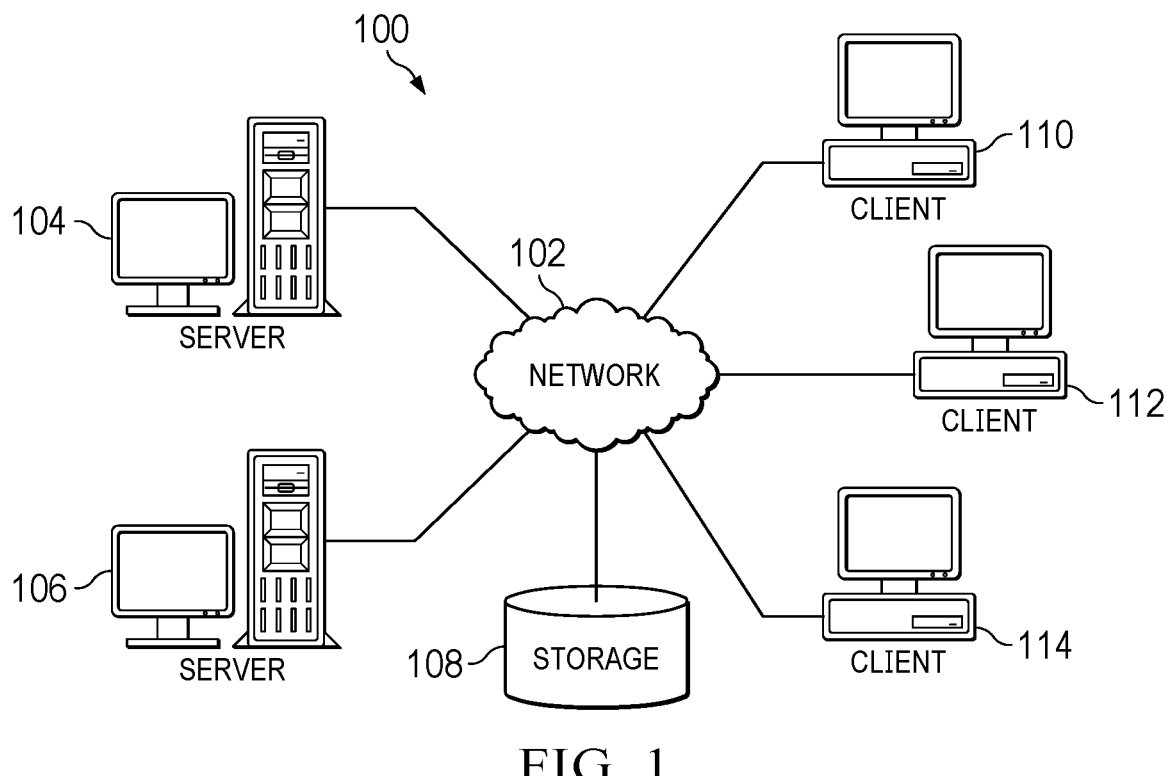
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second than a CPU, on the order of 100× or more. GPUs can be clustered together to run neural networks comprising hundreds of millions of connection nodes.

Figure 2:
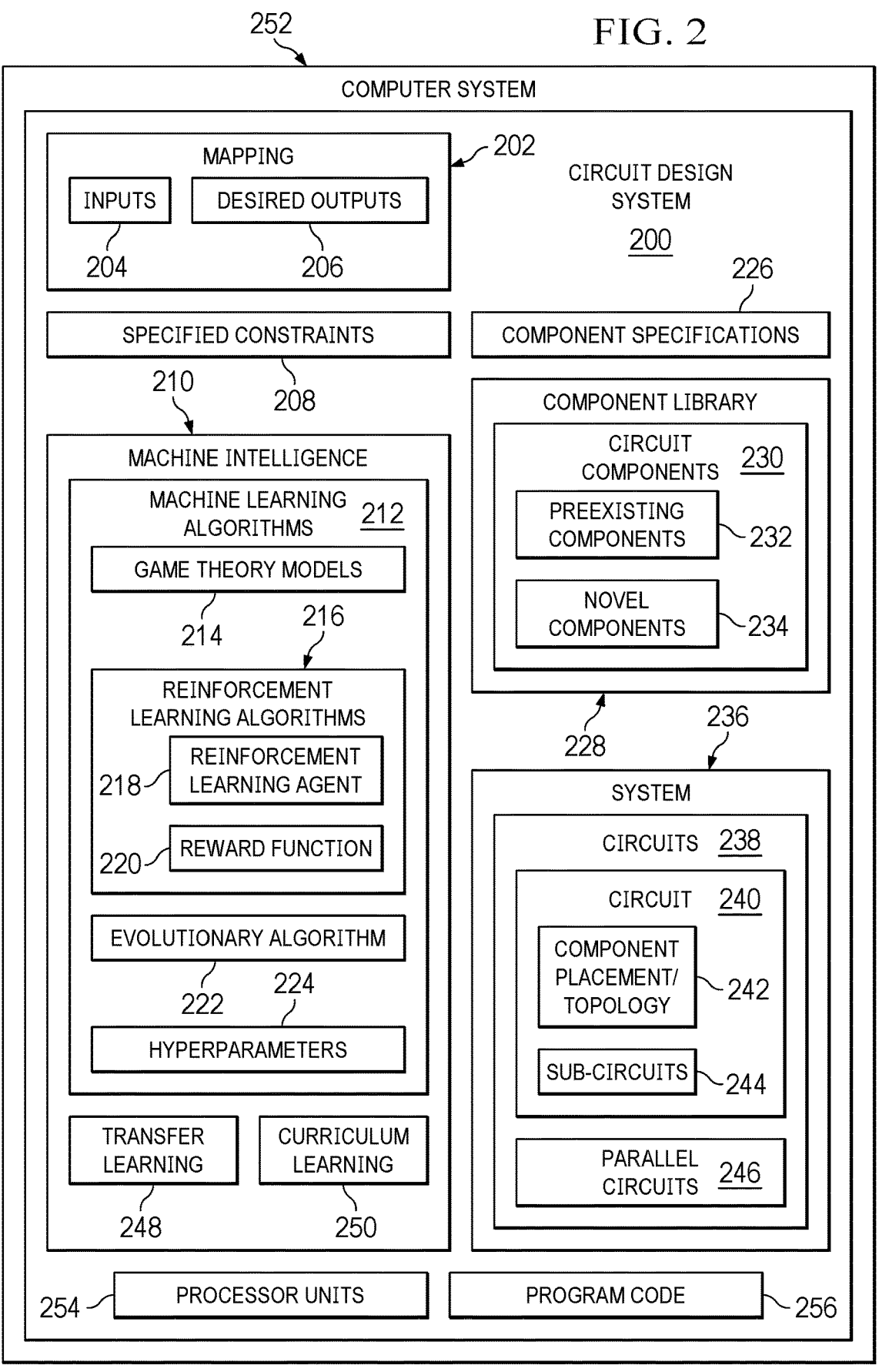
FIG. 2 depicts a block diagram of a circuit design system in accordance with an illustrative embodiment.

With reference now to FIG. 2, an illustration a block diagram of a circuit design system is depicted in accordance with an illustrative embodiment. In this illustrative example, circuit design system 200 includes components that can be implemented in hardware such as the hardware shown in network data processing system 100 in FIG. 1.

Circuit design system 200 creates a mapping 202 between inputs 204 and desired outputs 206. The mapped inputs 204 and outputs 206 are supplied to machine intelligence along with specified constraints 208. The specified constraints 208 may include, for example, energy efficiency, performance, SWaP (size, weight, and power), robustness to adversarial attacks, number of components, monetary costs of process or technology node, fabrication, and packaging (smallest feature size on a given CMOS process (terms like 350 nm, 45 nm, 7 nm, etc.), or effective operation in harsh environments.

Machine intelligence 210 can be implemented using one or more systems such as an artificial intelligence (AI) system, a neural network, or other suitable machine learning system. Machine intelligence may employ machine learning algorithms 212, which may include game theory models 214, reinforcement learning algorithms 216, or evolutionary algorithms 222. Reinforcement learning algorithms 216 comprise a reinforcement learning agent 218 that employs a reward function 220. Reward function 220 may be based on at least one of component specifications, circuit performance, component characteristics, or circuit characteristics. Machine learning algorithms 212 may be tuned by adjusting hyperparameters 224. Learning may be accelerated by transfer learning 248 or curriculum learning 250.

Machine intelligence 210 generates component specifications 226 for circuit components necessary to achieve the desired outputs 206 from the inputs 204 within the specified constraints 208. Specified constraints 208 may include hard constraints as well as design objectives. Component library 228 contains a listing of different circuit components 230 that may satisfy the component specifications 226 which circuit design system 200 may select to design circuits 238 and system 236. Examples of circuit components 230 include analog components (e.g., resistors, capacitors, transistors), digital components, neuromorphic computer components, quantum computer components, logical components, components composed of other components, or lines of computer code.

Circuit components 230 may include known, preexisting components 232 and novel components 234. In cases when none of the preexisting components 230 satisfy one of the component specifications 226, the circuit design system 200 may create novel components 234 that match the component specification in question and add it to the component library 228.

Circuit design system 200 arranges circuit components 230 that satisfy the necessary component specifications into a placement/topology 242 to form a circuit 240 that achieve the desired outputs 206 from inputs 204 within constraints 208. A circuit 240 may contain sub-circuits 244.

Circuit design system 200 may create multiple circuits 238 and arrange them in a larger system 236. The circuits 238 may include parallel circuits 246 and may be arrange in hierarchical structures within system 236. System 236 may encompass materials, devices, components, circuits, architectures, and applications.

Circuit design system 200 can be implemented in software, hardware, firmware, or a combination thereof. When software is used, the operations performed by circuit design system 200 can be implemented in program code configured to run on hardware, such as a processor unit. When firmware is used, the operations performed by circuit design system 200 can be implemented in program code and data and stored in persistent memory to run on a processor unit. When hardware is employed, the hardware can include circuits that operate to perform the operations in circuit design system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 252 is a physical hardware system and includes one or more data processing systems. When more than one data processing system is present in computer system 252, those data processing systems are in communication with each other using a communications medium. The communications medium can be a network. The data processing systems can be selected from at least one of a computer, a server computer, a tablet computer, or some other suitable data processing system.

As depicted, computer system 252 includes a number of processor units 254 that are capable of executing program code 256 implementing processes in the illustrative examples. As used herein a processor unit in the number of processor units 254 is a hardware device and is comprised of hardware circuits such as those on an integrated circuit that respond and process instructions and program code that operate a computer. When a number of processor units 254 execute program code 256 for a process, the number of processor units 254 is one or more processor units that can be on the same computer or on different computers. In other words, the process can be distributed between processor units on the same or different computers in a computer system. Further, the number of processor units 254 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
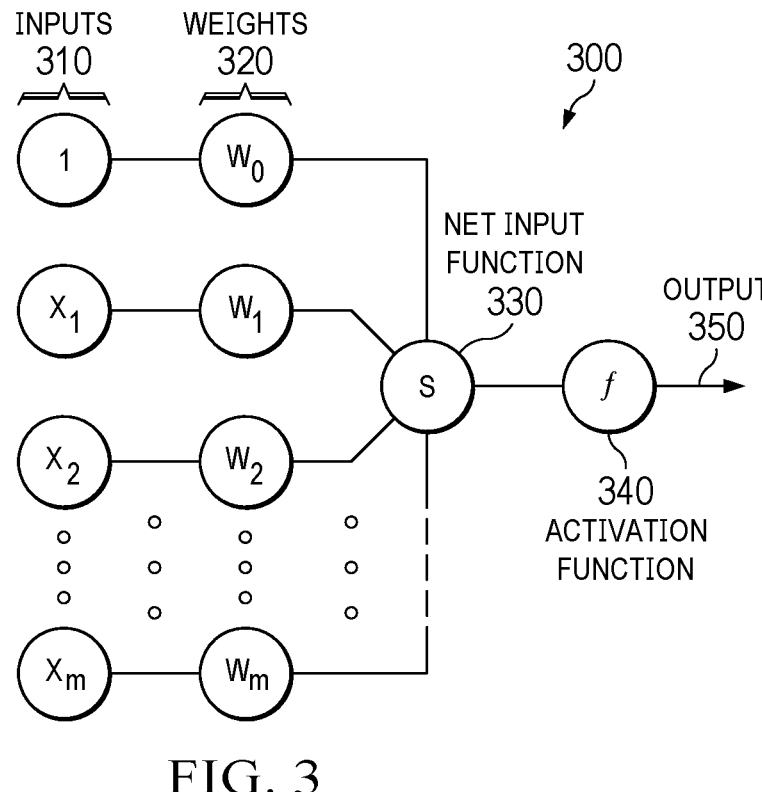
FIG. 3 is a diagram that illustrates a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The connections between nodes are called edges. When the node 300 receives an input value X, it multiplies X by the weight W assigned to that edge. The net input function 330 adds each X×W (e.g., $1 \times W_0$) product to the bias term b and then passes the result to the activation function 340 which produces the node's output 350.

The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A layer is a collection of nodes that receives inputs from a previous layer and passes an output to the next layer. Signals travel from the first (input) layer to the last (output) layer, passing through any layers in between. Each layer's output acts as the next layer's input.

Figure 4:
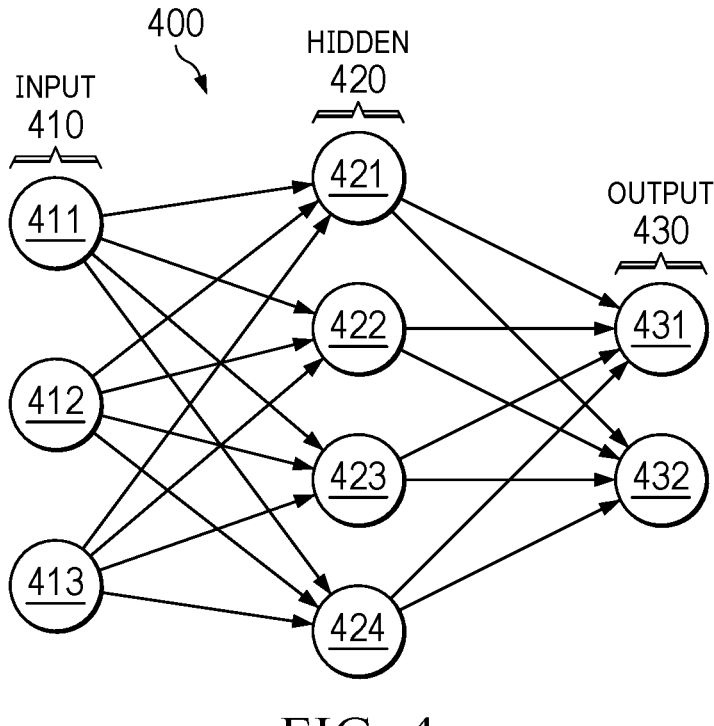
FIG. 4 depicts a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of input nodes 410, a layer of hidden nodes 420, and a layer of output nodes 430. The nodes in these layers might comprise nodes such as node 300 in FIG. 3. The input nodes 410 are those that receive information from the environment (i.e., a set of external training data). Each input node in layer 410 takes a low-level feature from an item in the dataset and passes it to the hidden nodes in the next layer 420.

In fully connected feed-forward networks, each node in one layer is connected to every node in the next layer. For example, node 421 in hidden layer 420 receives input from all of the input nodes 411, 412, and 413 in input layer 410. Each input value x from the separate nodes 411-413 is multiplied by its respective weight, and all of the products are summed. The result is passed through the activation function to produce output to output nodes 431 and 432 in output layer 430. A similar process is repeated at hidden nodes 422, 423, and 424. In the case of a deeper neural network, the outputs of hidden layer 420 serve as inputs to the next hidden layer.

Neural network layers can be stacked to create deep networks. The activities of its hidden nodes can be used as inputs for a deeper level, thereby allowing stacking of neural network layers. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm deciphers the patterns that exist between the input training data and the known output values to create a model that can reproduce the same underlying rules with new data. Examples of supervised learning algorithms include, but are not limited to, regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include, but are not limited to, k-means clustering, association analysis, and descending clustering.

Whereas supervised and unsupervised methods learn from a dataset, reinforcement learning (RL) methods learn from interactions with a simulation, which is referred to as an "environment." While interacting with the environment, the reinforcement learning model (referred to as an "agent"), takes actions and receives scalar rewards. The rewards correspond with the quality of the chosen action, given the observed state. Algorithms such as Q-learning are used to train the agent to maximize the expected sum of future rewards.

Figure 5:
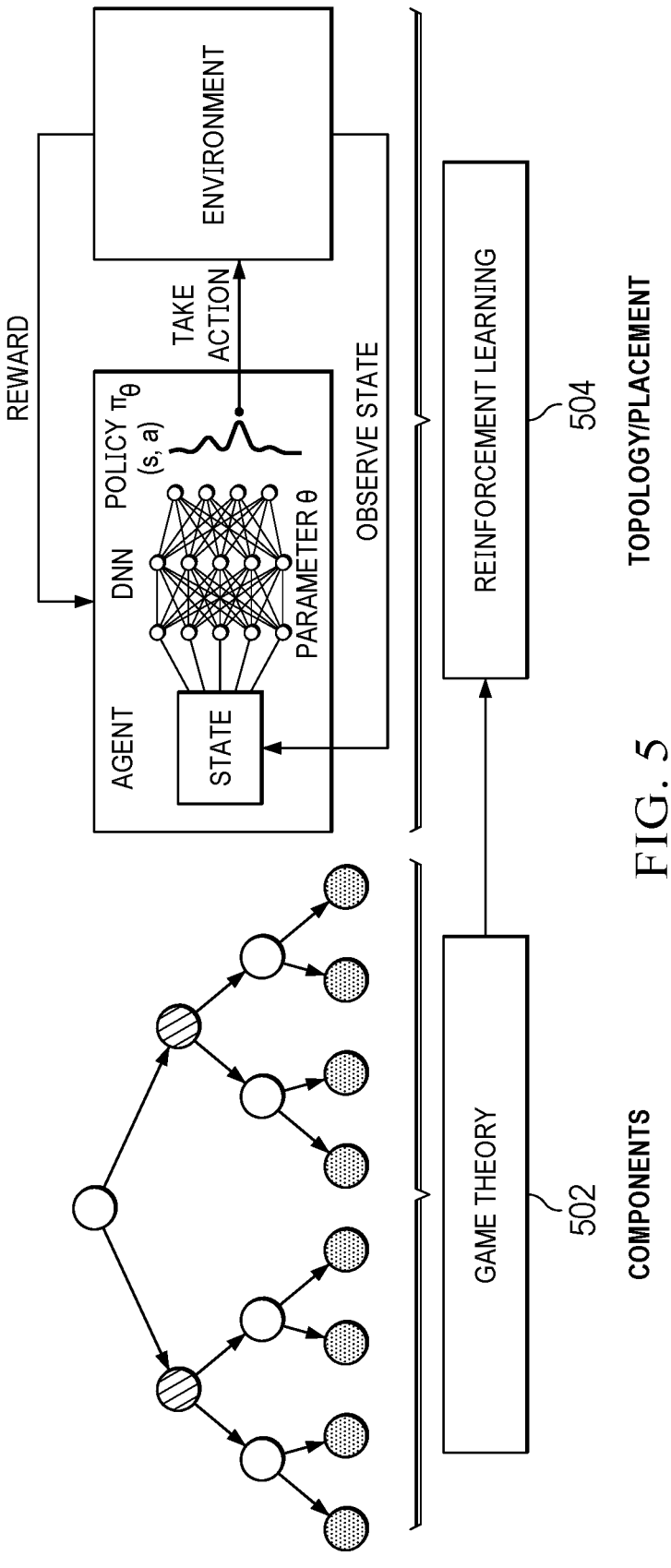
FIG. 5 depicts a diagram illustrating the relationship between game theory and reinforcement learning for circuit co-design in accordance with an illustrative embodiment.

FIG. 5 depicts a diagram illustrating the relationship between game theory and reinforcement learning for circuit co-design in accordance with an illustrative embodiment. In this example, reinforcement learning 504 is augmented by formal game theoretic methods 502 to drive codesign.

Game theory is a mathematical subject used to analyze strategies and interactions among cooperating or competing groups. Traditionally, a game, in the game theoretic sense, consists of players; actions for a player to take; strategies to determine how players choose actions; and payoffs determined by action choice. The basic notion is that players select a strategy to play. This selection could be done in tandem with other players or in sequence, and other players may or may not know strategies selected by others. A game is played with players playing actions according to their strategy, and then rewards are given. Games may be iterative with the objective to find the best strategy for actions. The "best strategy" is typically a Nash equilibrium. A Nash equilibrium is a set consisting of a strategy for each player where no single player has anything to gain by deviating to a different strategy. In multi-player games this means that you will not do better on average by switching to a different strategy.

Calculation of these equilibrium strategies is not trivial. Nonetheless, such strategies are obviously valuable. Game theory has been used to optimize strategies in a variety of fields, including business, economics, and transportation. Game theory is useful in analyzing control strategies and optimizing systems as well.

The codesign framework can use game theory 502 to narrow device pools using constraints such as data, device physics, SWaP constraints, and circuit topology. From these constraints, a cooperative game theory game may be played. A novel approach to linear circuit design using game theory may comprise constructing a cooperative game among players who place a single type of device or circuit component. Players take turns electing to play their piece or to not play their piece. All knowledge of previous played components is available to all players. Any player may choose to terminate the circuit instead of playing their component. Once a circuit is terminated, it is scored and a payoff is given to all players if the circuit meets the desired expectations. Penalties may also be given out if certain characteristics of the circuits are not desirable (i.e., it meets expectations but would not hold up under certain temperatures).

Another option could be a cooperative game where players do not construct a circuit, but instead compete to create a minimal set of devices that could create the circuit. In this manner, a properly defined game could produce a set of devices to use, narrowing down the visible pool for a RL focused design algorithm.

Game theory can be used for both design and for narrowing down the pool of components. It is worth noting that a single player approach would be an RL approach, depending on where the rewards are given.

The output of this method is a game strategy. In this context, a strategy is a mathematical description of creating a desired circuit meeting any specified constraints. This strategy, by construction, contains information on types of components to use and how to place components. This information may be passed along to a RL component 504 to build a circuit from a reduced set of information. Additionally, the strategy may be played to create an initial circuit for further optimization. In the process of creating this strategy, different circuit components may drop out of the pool of viable components or may rearrange in unexpected and revolutionary ways. In this manner, artificial intelligence and machine learning enable the combination of algorithms, hardware, and physics for the discovery and codesign of new neural circuits.

Figure 6:
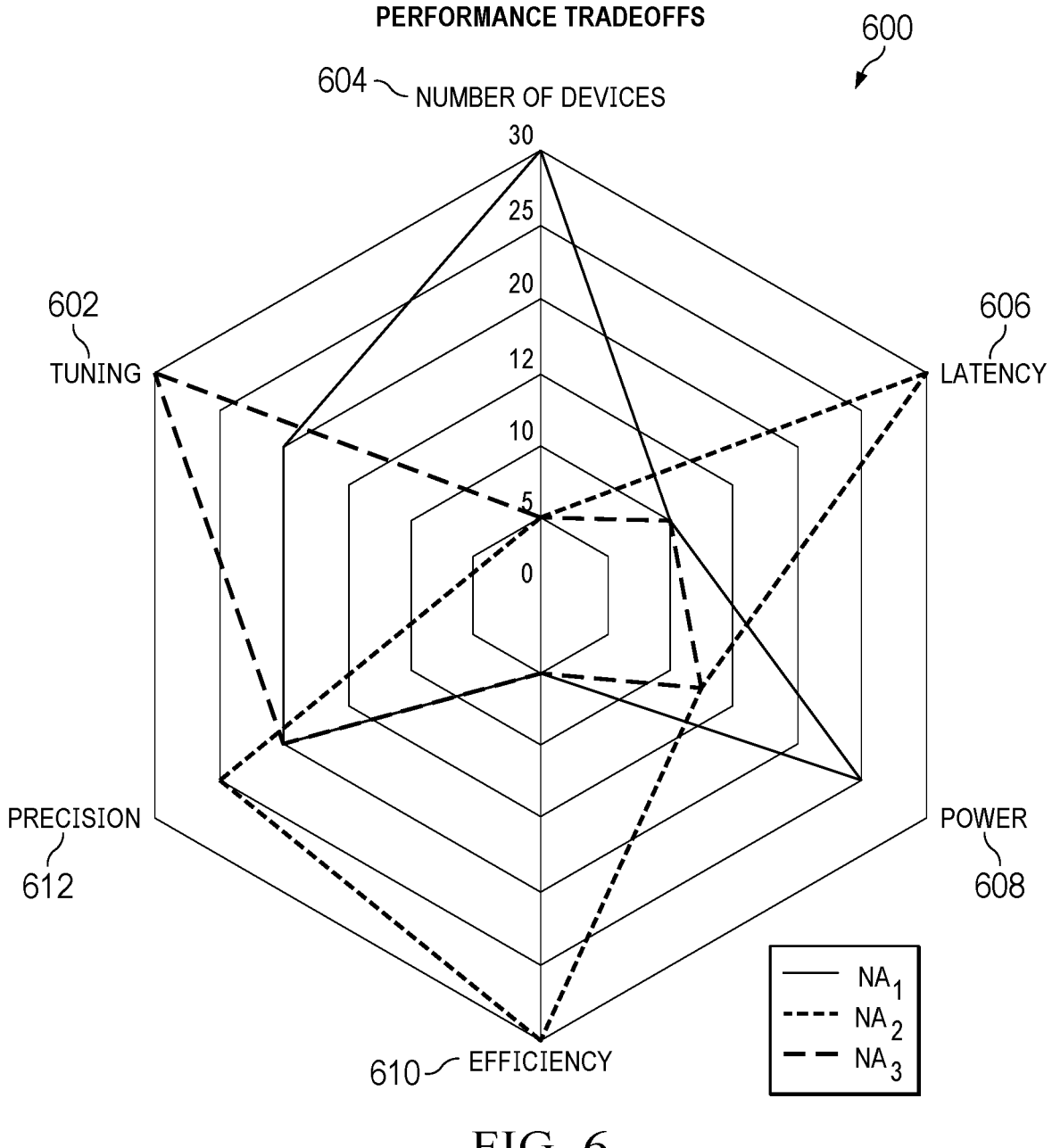
FIG. 6 depicts a graph illustrating performance tradeoffs of different circuit designs in accordance with an illustrative embodiment.

FIG. 6 depicts a graph illustrating performance tradeoffs of different circuit designs in accordance with an illustrative embodiment. Graph 600 includes a number of different domains including tuning 602, number of devices 604, latency 606, power 608, efficiency 610, and precision 612. In the present example, graph 600 illustrates three different neural architectures $NA_1$, $NA_2$, and $NA_3$ with different respective balances of domains 602-612.

Different applications will impact design choices. Domain knowledge will vary depending on the application space. Different tasks will prioritize different domains within the algorithm landscape, resulting in different devices, circuits, and architectures.

Figure 7:
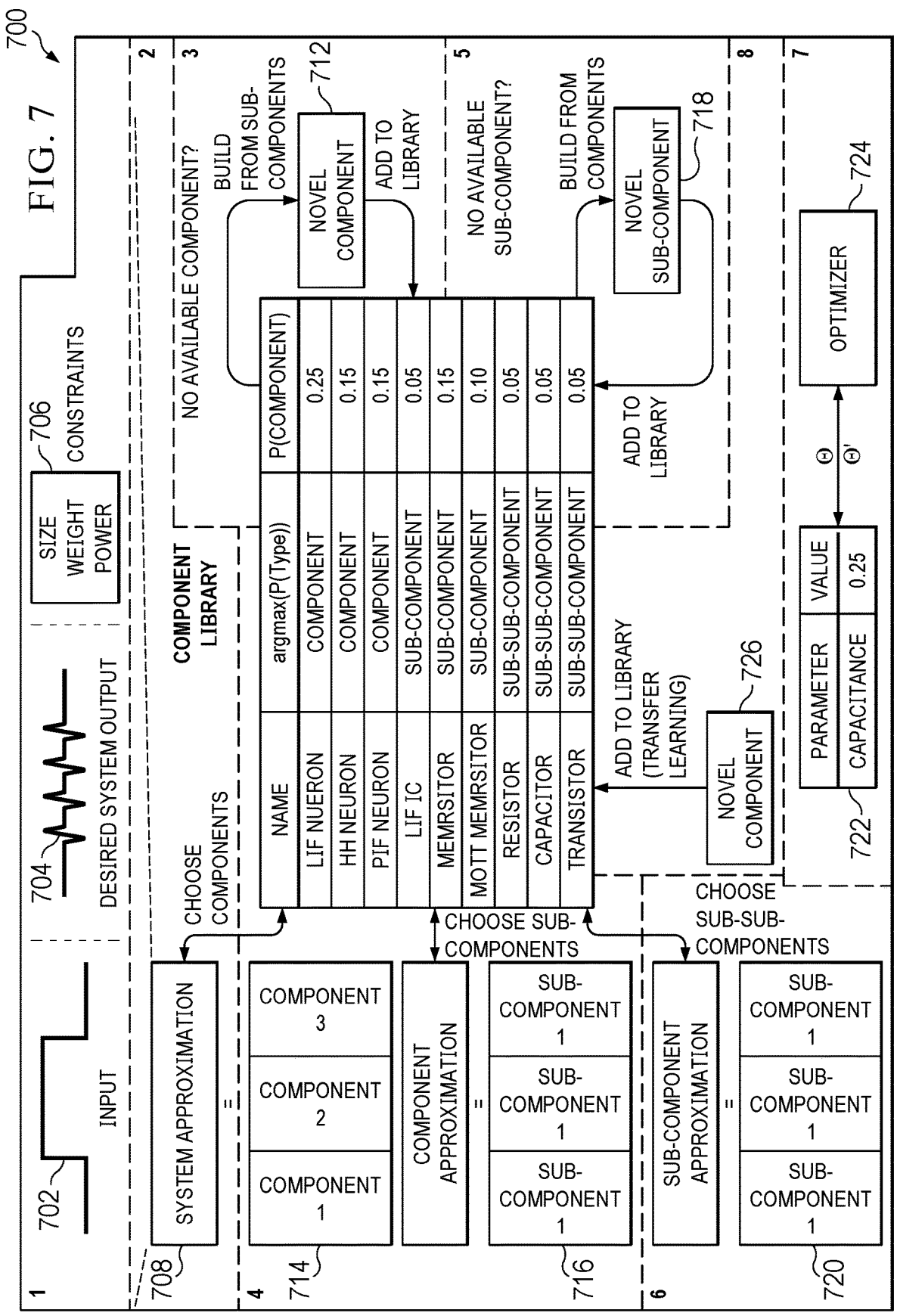
FIG. 7 depicts a diagram illustrating a process for AI-enhanced circuit design in accordance with an illustrative embodiment.

FIG. 7 depicts a diagram illustrating a process for AI-enhanced circuit design in accordance with an illustrative embodiment. Process 700 begins with the user supplying an input signal 702 and a desired output signal 704, along with design constraints 706, which may include both hard constraints and soft objectives.

The system design tool chooses components from a library 710 by maximizing the probability that a chosen component will help approximate a system 708, given the design constraints. If no existing component is likely to help approximate the system, a new component 712 may be designed from sub-components. In the present example, process 700 uses a single library 710. However, it should be noted that multiple libraries may be used. For example, there may be a library for components and another library for sub-components.

Components 714 are optimized by choosing sub-components 716 from the library 710. If existing sub-components poorly approximate the component, a new sub-component

718 may be created. If appropriate low-level sub-components are not available, specifications for novel sub-components may be output by the tools such that, if a sub-component with the specification is fabricated, that sub-component could be used to build the circuit of interest.

Sub-components 716 may be decomposed into appropriate basic components 720. An optimizer 724 may optimize the parameters 722 of the basic components 720.

Novel components 726 can be added to the basic components library 710 via transfer learning.

Figure 8:
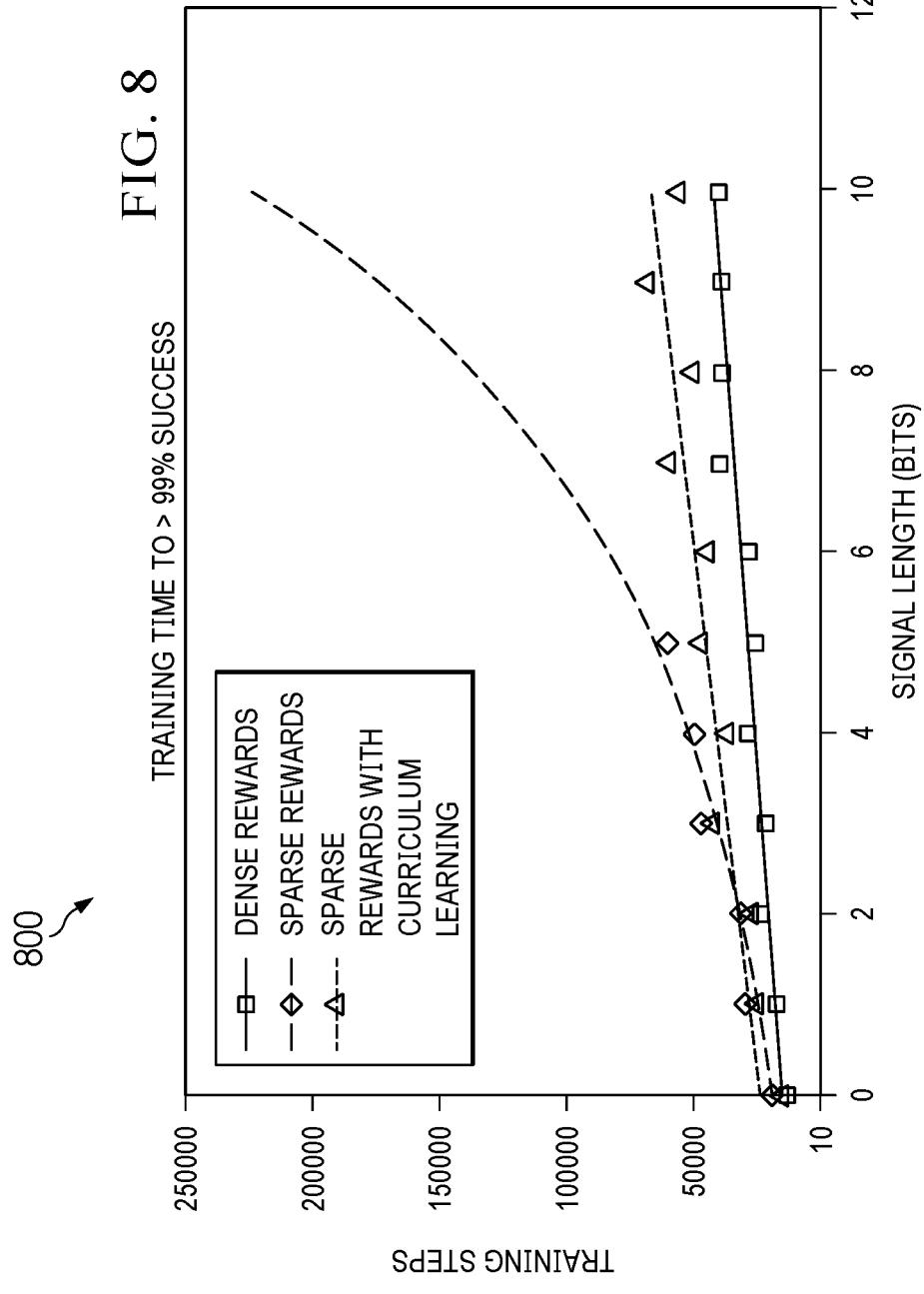
FIG. 8 depicts a graph illustrating training time as a function of circuit length in accordance with an illustrative embodiment.

FIG. 8 depicts a graph illustrating training time as a function of circuit length in accordance with an illustrative embodiment. Graph 800 illustrates the relationship between learning speed and reward function. In the present example, differences can be seen between the use of dense rewards, sparse rewards, and sparse rewards with curriculum learning.

With dense rewards, the RL agent is rewarded every time it places a component. This reward signal is information rich, which allows for rapid learning that scales linearly with the complexity of the circuit. However, this reward signal is not realistic to provide in the real world because it requires the evaluator to know in advance what the "correct" circuit is.

Sparse rewards inform the RL agent if it is correct after the entire circuit is designed. Sparse rewards can always be provided if a circuit can be tested to confirm that it performs within specifications. However, when provided with sparse rewards, RL agent training time scales exponentially with the length and complexity of the circuit.

Sparse rewards with curriculum learning breaks up the circuit design into a series of progressive steps, wherein each steps comprises an incremental increase in the complexity of the circuit. In this approach, the complexity of the circuit is increased whenever the RL agent begins to perform well when designing less-complex circuits. Sparse rewards with curriculum learning allow training time to scale linearly with the length of the circuit.

Expert domain knowledge can be incorporated into the RL agent by using "action masking." The RL agent chooses components by outputting "probabilities" that each component should be placed such that the sum of all "probabilities" sum to 1 (referred to as the "action vector"). The component with the highest "probability" is then placed in the circuit. If a human knows that a component should not be placed in the circuit, this information can be included by creating a "mask" vector that gets multiplied (element-wise) by the action vector. Components that should not be chosen can be assigned a value of zero in the corresponding element of the "mask" vector. Mask values greater than 1 increase the probability that a component will be chosen. Mask values between 0 and 1 decrease the probability that a component will be chosen.

Below are some examples of the utility of the illustrative embodiments.

Suppose that the component library contains a "detect" component with a cost of 10 and a "delay" component with a cost of 1. To minimize the cost of a circuit, the "detect" components are only placed when there is something to detect. Additionally, the number of "detect" components placed may be minimized by ignoring some differences-especially if the performance of the circuit remains unchanged when these differences are ignored. Humans might perform this process by first building a circuit and then removing "detect" components while performing time-intensive simulations to see if circuit performance is affected. For simple circuits, this process would take minutes to days. The RL methods of the illustrative embodiments automate this process to decrease the circuit design time to seconds, while avoiding simulation (after the initial training period).

Aside from the advantage of speed, RL circuit design can be scaled. Whereas human expertise in circuit design is limited, the illustrative embodiments may deploy an army of RL agents to design circuits concurrently.

Below are examples of how the illustrative embodiments may be used to produce circuits with real-world, real-time applications.

Different types of delays may be employed in a circuit. For example, the RL agent may observe a desired delay and be asked to place delay blocks to achieve this delay. In the case of scalar binary signals, the RL agent may design a circuit that delays an input signal of "1" or "0" by the specified amount of time.

Delays may also serve as placeholders. For example, a component may have two inputs, wherein the first input is the signal being detected (or not detected if the signal is actually noise), and the second input is the output of the previous component of the circuit. If the circuit operates in real-time, a delay bock outputs the second input signal directly with some delay (usually, but not always, one timestep). Delay components may be useful as placeholders in many situations. For example, in situations where signal and noise cannot be discriminated (because their distributions overlap too much), it may not be beneficial to place a component in the circuit to perform discrimination. Placing this component might be costly, for example. However, if a component with non-trivial delay is left out of the circuit, the inputs and outputs may not align in time. Thus, a less-costly delay component may be substituted for a more-costly detect component.

Figure 9:
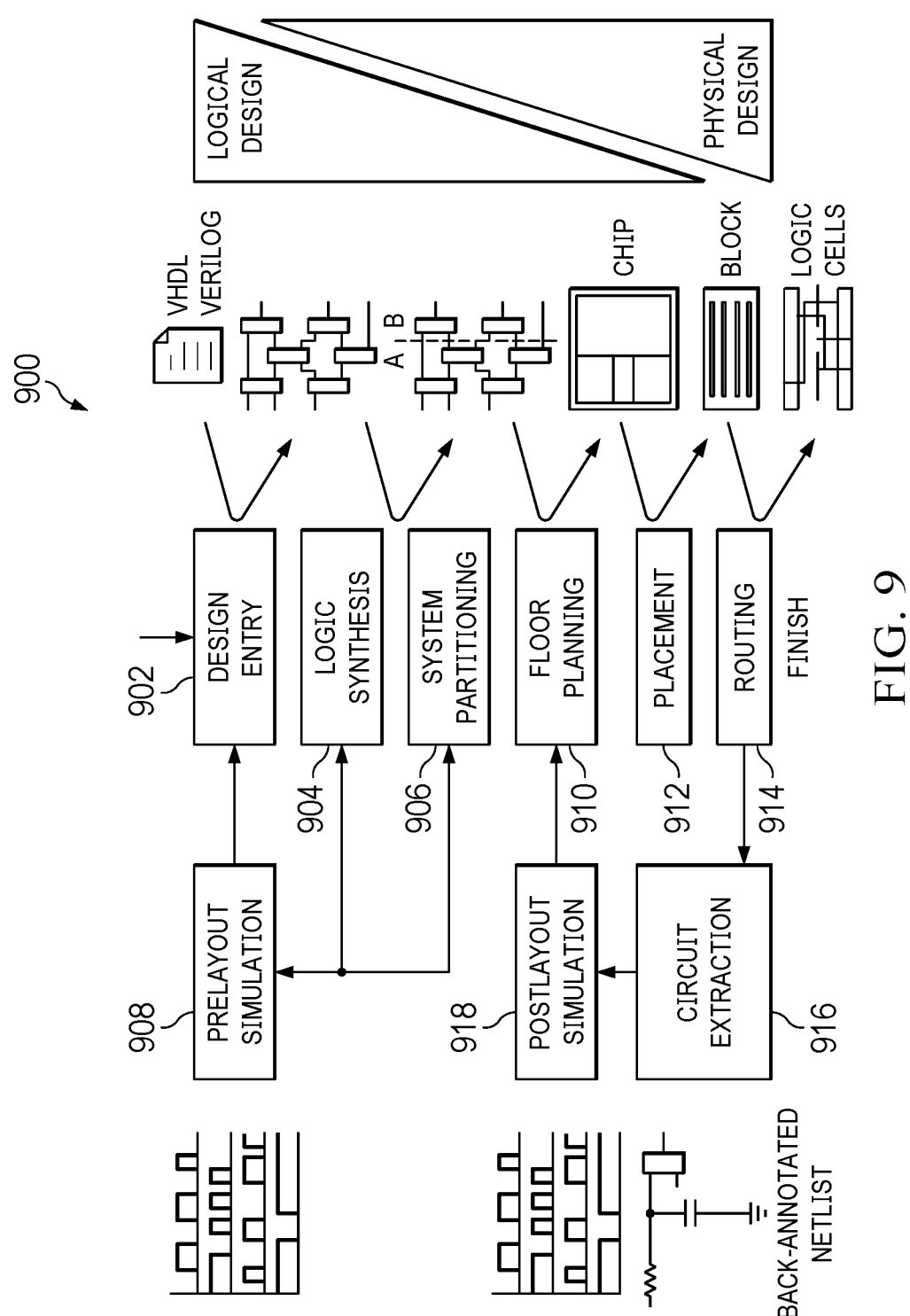
FIG. 9 depicts a diagram illustrating a process for designing a chip in which the illustrative embodiments may be deployed.

FIG. 9 depicts a diagram illustrating a process for designing a chip in which the illustrative embodiments may be deployed. Process 900 begins with a design entry 902, followed by logic synthesis 904. Process 900 then performs system partitioning 906. The results of the system partitioning 906 may then be fed into a pre-layout simulation 908 as well as back into the logic synthesis 904. The results of the pre-layout simulation 908 may be fed back into the design entry 902.

After system partitioning 906, process 900 performs floor planning 910 of the chip and placement 912 of components. Routing 914 is then determined resulting in circuit extraction 916. The extracted circuit is then fed into post-layout simulation 918. Results of the post-layout simulation 918 may then be fed back into floor planning 910.

Figure 10:
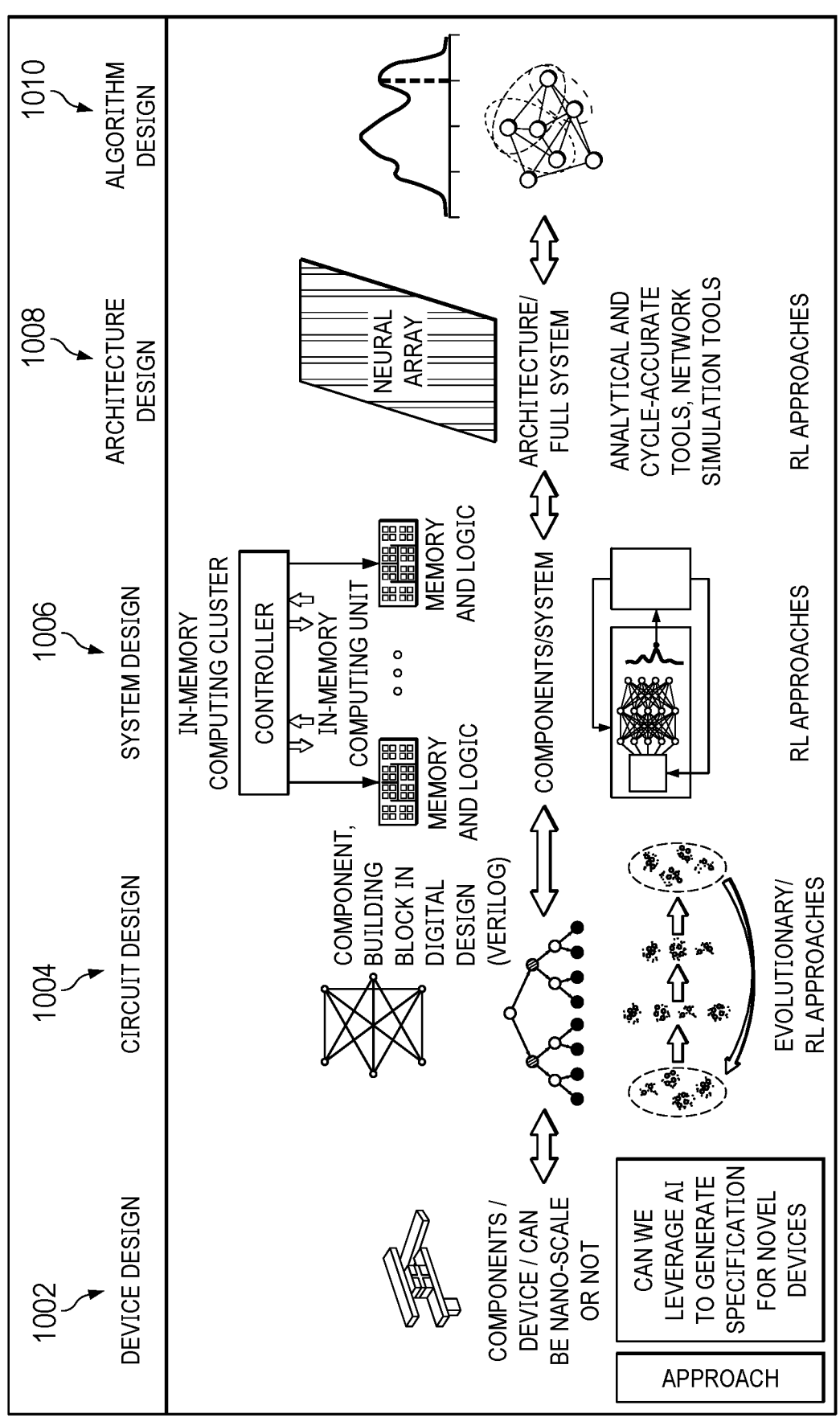
FIG. 10 depicts a diagram illustrating how AI approaches may be applied to different levels of computing design in accordance with illustrative embodiments.

FIG. 10 depicts a diagram illustrating how AI approaches may be applied to different levels of computing design in accordance with illustrative embodiments. In the present example, computing design comprises device design 1002, circuit design 1004, system design 1006, architecture design 1008, and algorithm design 1010. Each design level may influence other levels above and below it.

Device design 1002 may include components and subcomponent devices. These device designs influence circuit design 1004, which may be discovered through application of evolutionary and RL approaches. Circuit designs 1004 may be combined into a larger system design 1006 such as, an in-memory computing cluster. This system design 1006 may be created with RL approached employed with a deep neural network.

System designs 1006 may be combined into an architecture/full system design 1008. The architecture design 1008 may be developed with an RL approach in a deep neural network or with RL approaches employing analytical and cycle-accurate tools and network simulation tools. An algorithm design 1010 may be developed and optimized for use on an architecture design 1008 or vice versa. Again, RL approaches employing analytical and cycle-accurate tools and network simulation tools may be used for algorithm design 1010.

Figure 11:
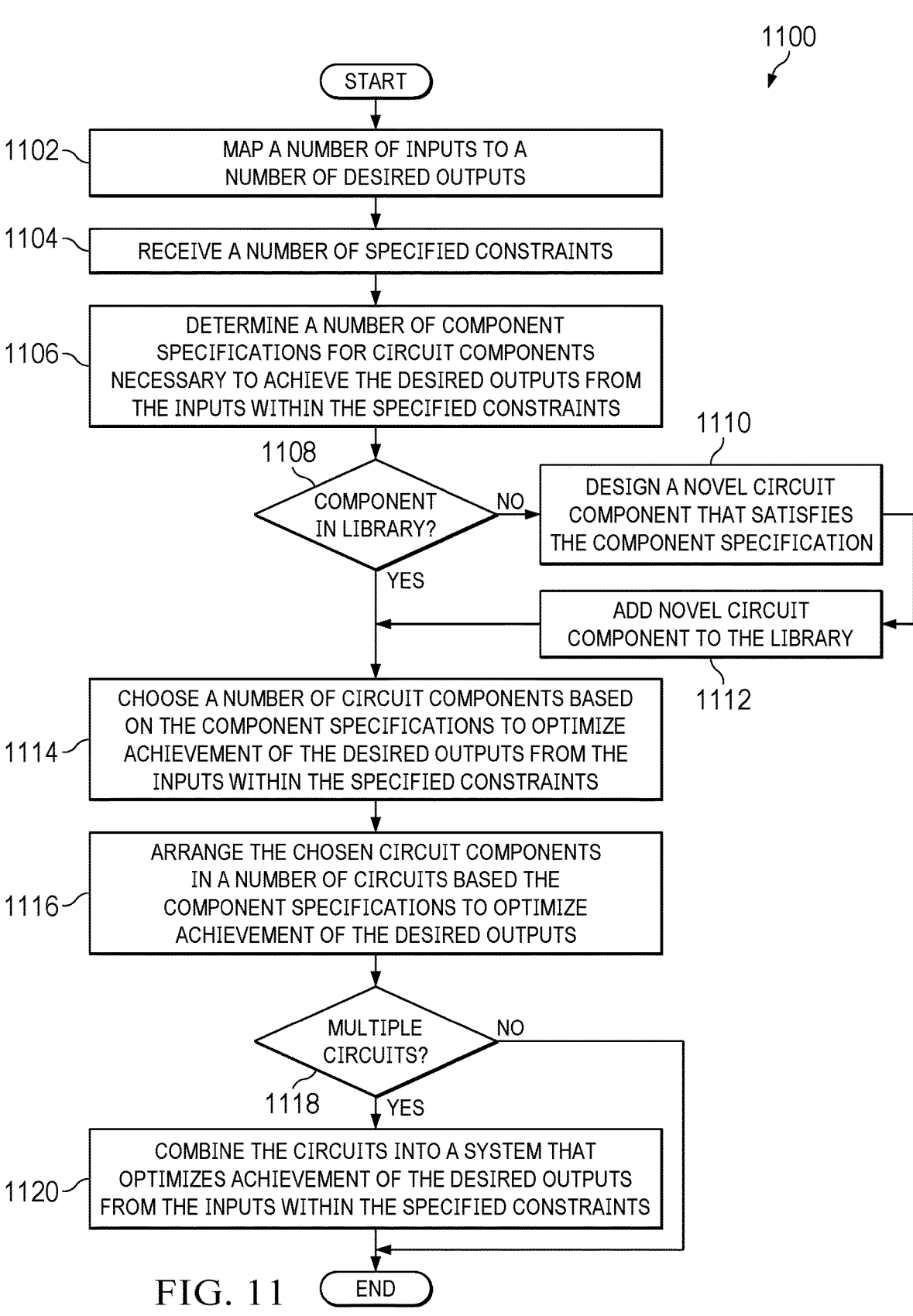
FIG. 11 depicts a flowchart illustrating a method for circuit design in accordance with illustrative embodiments.

FIG. 11 depicts a flowchart illustrating a method for circuit design in accordance with illustrative embodiments. Process in 1100 can be implemented in hardware, software, or both. When implemented in software, the process can take the form of program code that is run by one of more processor units located in one or more hardware devices in one or more computer systems. Process 1100 can be implemented in circuit design system 200 shown in FIG. 2.

Process 1100 begins by mapping a number of inputs to a number of desired outputs (step 1102). The system also receives a number of specified constraints (step 1104).

The method determines a number of component specifications for circuit components necessary to achieve the desired outputs from the inputs within the specified constraints (step 1106).

Available, preexisting circuit components may be contained in a library of circuit components. The method determines if the library contains circuit components that match the component specifications (step 1108). Responsive to a determination that the library does not contain a preexisting circuit component that matches one of the component specifications, the system designs a novel circuit component that satisfies the component specification (step 1110) and adds the novel circuit component to the library (step 1112).

The method chooses a number of circuit components based on the component specifications to optimize achievement of the desired outputs from the inputs within the specified constraints (step 1114) and arranges the chosen circuit components in a number of circuits based the component specifications to optimize achievement of the desired outputs (step 1116).

If the system creates multiple circuits (step 1118) it may combine the circuits into a higher level system that optimizes achievement of the desired outputs from the inputs within the specified constraints (step 1120). Process 1100 then ends.

Figure 12:
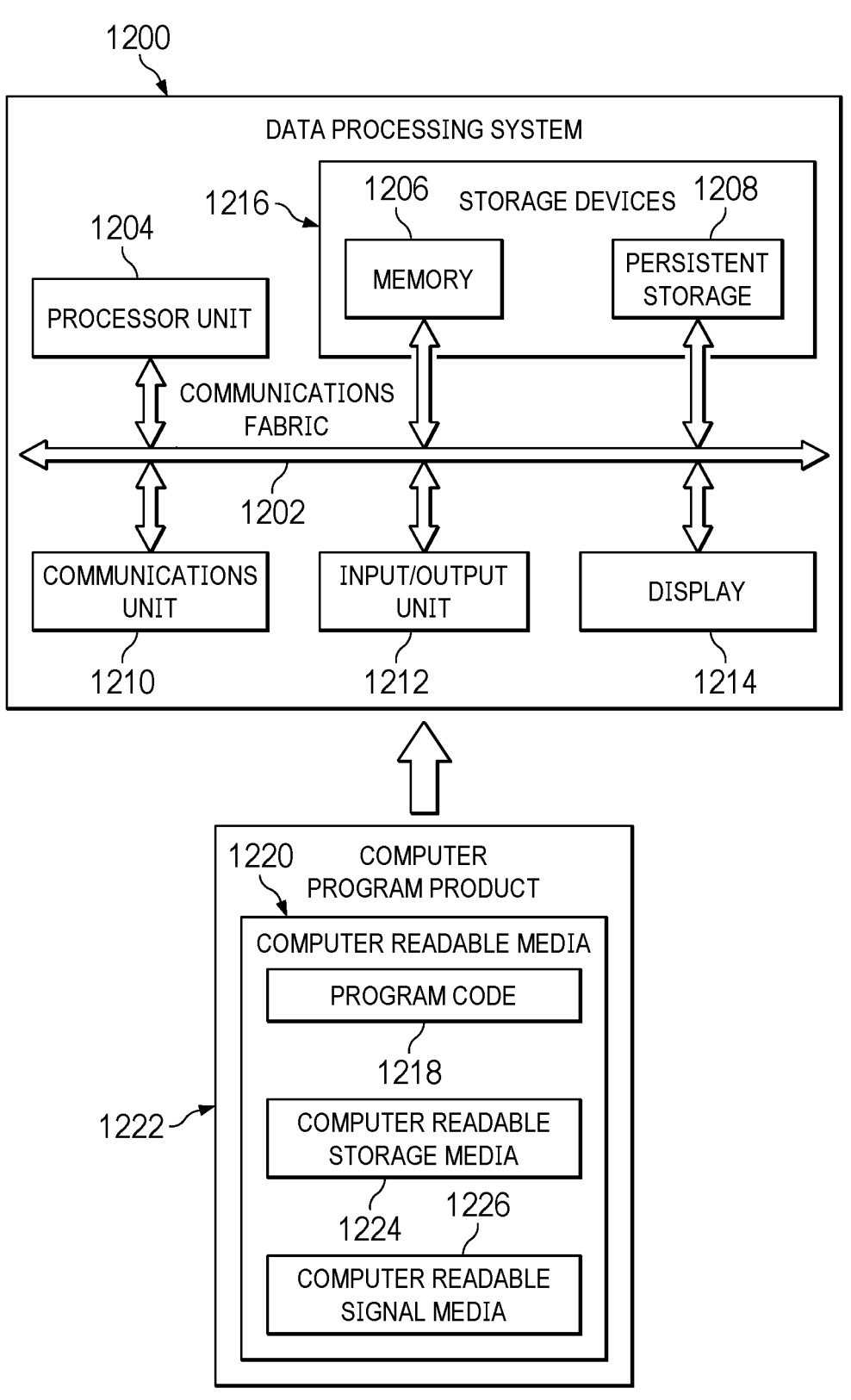
FIG. 12 is a diagram of a data processing system depicted in accordance with an illustrative embodiment.

Turning to FIG. 12, a diagram of a data processing system is depicted in accordance with an illustrative embodiment. Data processing system 1200 may be used to implement servers 104 and 106 and clients 110, 112, 114 in Network data processing system 100 in FIG. 1 and circuit design system 200 in FIG. 2. Data processing system 1200 is an example of a system in which computer-readable program code or program instructions implementing processes of illustrative embodiments may be run. In this illustrative example, data processing system 1200 includes communications fabric 1202, which provides communications between processor unit 1204, memory 1206, persistent storage 1208, communications unit 1210, input/output unit 1212, and display 1214.

Processor unit 1204 serves to execute instructions for software applications and programs that may be loaded into memory 1206. Processor unit 1204 may be a set of one or more hardware processor devices or may be a multi-processor core, depending on the particular implementation. Further, processor unit 1204 may be implemented using one or more heterogeneous processor systems, in which a main processor is present with secondary processors on a single chip. As another illustrative example, processor unit 1204 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 1206, in these examples, may be, for example, a random access memory, or any other suitable volatile or non-volatile storage device. Persistent storage 1208 may take various forms, depending on the particular implementation. For example, persistent storage 1208 may contain one or more devices. For example, persistent storage 1208 may be a hard drive, a flash memory, a rewritable optical disk, a rewritable magnetic tape, or some combination of the above. The media used by persistent storage 1208 may be removable. For example, a removable hard drive may be used for persistent storage 1208.

Communications unit 1210, in this example, provides for communication with other computers, data processing systems, and devices via network communications unit 1210 may provide communications using both physical and wireless communications links. The physical communications link may utilize, for example, a wire, cable, universal serial bus, or any other physical technology to establish a physical communications link for data processing system 1200. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 1200.

Input/output unit 1212 allows for the input and output of data with other devices that may be connected to data processing system 1200. For example, input/output unit 1212 may provide a connection for user input through a keypad, keyboard, and/or some other suitable input device. Display 1214 provides a mechanism to display information to a user and may include touch screen capabilities to allow the user to make on-screen selections through user interfaces or input data, for example.

Instructions for the operating system, applications, and/or programs may be located in storage devices 1216, which are in communication with processor unit 1204 through communications fabric 1202. In this illustrative example, the instructions are in a functional form on persistent storage 1208. These instructions may be loaded into memory 1206 for running by processor unit 1204. The processes of the different embodiments may be performed by processor unit 1204 using computer-implemented program instructions, which may be located in a memory, such as memory 1206. These program instructions are referred to as program code, computer-usable program code, or computer-readable program code that may be read and run by a processor in processor unit 1204. The program code, in the different embodiments, may be embodied on different physical computer-readable storage devices, such as memory 1206 or persistent storage 1208.

Program code 1218 is located in a functional form on computer-readable media 1220 that is selectively removable and may be loaded onto or transferred to data processing system 1200 for running by processor unit 1204. Program code 1218 and computer-readable media 1220 form computer program product 1222. In one example, computer-readable media 1220 may be computer-readable storage media 1224 or computer-readable signal media 1226. Computer-readable storage media 1224 may include, for example, an optical or magnetic disc that is inserted or placed into a drive or other device that is part of persistent storage 1208 for transfer onto a storage device, such as a hard drive, that is part of persistent storage 1208. Computer-readable storage media 1224 also may take the form of a persistent storage, such as a hard drive, a thumb drive, or a flash memory that is connected to data processing system 1200. In some instances, computer-readable storage media 1224 may not be removable from data processing system 1200.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 1218 may be downloaded over a network to persistent storage 1208 from another device or data processing system through computer-readable signal media 1226 for use within data processing system 1200. For instance, program code stored in a computer-readable storage media in a data processing system may be downloaded over a network from the data processing system to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to, or in place of, those illustrated for data processing system 1200. Other components shown in FIG. 12 can be varied from the illustrative examples shown. The different embodiments may be implemented using any hardware device or system capable of executing program code. As one example, data processing system 1200 may include organic components integrated with inorganic components and/or may be comprised entirely of organic components excluding a human being. For example, a storage device may be comprised of an organic semiconductor.

As another example, a computer-readable storage device in data processing system 1200 is any hardware apparatus that may store data. Memory 1206, persistent storage 1208, and computer-readable storage media 1224 are examples of physical storage devices in a tangible form.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1206 or a cache such as found in an interface and memory controller hub that may be present in communications fabric 1202.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of automated circuit design, the method comprising:
   using a number of processors to perform the steps of:
   mapping a number of inputs to a number of desired outputs;
   receiving a number of specified constraints;

determining a number of component specifications for circuit components necessary to achieve the desired outputs from the inputs within the specified constraints;

choosing a number of circuit components based on the component specifications to optimize achievement of the desired outputs from the inputs within the specified constraints; and arranging the chosen circuit components in a number of circuits based the component specifications to optimize achievement of the desired outputs.

2. The method of claim 1, wherein the circuit components arranged in the circuit are chosen from a library of circuit components.

3. The method of claim 2, further comprising, responsive to a determination that the library does not contain a preexisting circuit component that matches one of the component specifications:

designing a novel circuit component that satisfies the component specification; and adding the novel circuit component to the library.

4. The method of claim 1, wherein the constraints comprise at least one of:

energy efficiency;

performance;

size, weight, and power (SWaP);

robustness to adversarial attacks;

number of components;

monetary costs of process or technology node, fabrication, and packaging; or operation in harsh environments.

5. The method of claim 1, wherein the steps of determining the component specifications, choosing the circuit components, and arranging the circuit components in the circuit occur via at least one of:

reinforcement learning;

evolutionary algorithms; or game theory.

6. The method of claim 5, wherein a reinforcement learning agent employs a reward function based on at least one of:

component specifications;

circuit performance;

component characteristics; or circuit characteristics.

7. The method of claim 5, wherein learning is accelerated by at least one of:

transfer learning; or curriculum learning.

8. The method of claim 1, further comprising:

creating multiple circuits; and combining the circuits into a system that optimizes achievement of the desired outputs from the inputs within the specified constraints.

9. The method of claim 1, wherein the circuit components comprise at least one of:

analog components;

digital components;

neuromorphic computer components;

quantum computer components;

logical components;

components composed of other components; or lines of computer code.

10. The method of claim 1, wherein the circuits comprise at least one of:

parallel circuits;

sub-circuits; or circuits arranged in hierarchical structures.

11. A system for automated circuit design, the system comprising:

a storage device that stores program instructions; and one or more processors operably connected to the storage device and configured to execute the program instructions to cause the system to:

map a number of inputs to a number of desired outputs;

receive a number of specified constraints;

determine a number of component specifications for circuit components necessary to achieve the desired outputs from the inputs within the specified constraints;

choose a number of circuit components based on the component specifications to optimize achievement of the desired outputs from the inputs within the specified constraints; and arrange the chosen circuit components in a number of circuits based the component specifications to optimize achievement of the desired outputs.

12. The system of claim 11, wherein the circuit components arranged in the circuit are chosen from a library of circuit components.

13. The system of claim 12, wherein the processors further execute instructions to, responsive to a determination that the library does not contain a preexisting circuit component that matches one of the component specifications:

design a novel circuit component that satisfies the component specification; and add the novel circuit component to the library.

14. The system of claim 11, wherein the constraints comprise at least one of:

energy efficiency;

performance;

size, weight, and power (SWaP);

robustness to adversarial attacks;

number of components;

monetary costs of process or technology node, fabrication, and packaging; or operation in harsh environments.

15. The system of claim 11, wherein the steps of determining the component specifications, choosing the circuit components, and arranging the circuit components in the circuit occur via at least one of:

reinforcement learning;

evolutionary algorithms; or game theory.

16. The system of claim 15, wherein a reinforcement learning agent employs a reward function based on at least one of:

component specifications;

circuit performance;

component characteristics; or circuit characteristics.

17. The system of claim 15, wherein learning is accelerated by at least one of:

transfer learning; or curriculum learning.

18. The system of claim 11, wherein the processors further execute instructions to:

creating multiple circuits; and combining the circuits into a system that optimizes achievement of the desired outputs from the inputs within the specified constraints.

19. The system of claim 11, wherein the circuit components comprise at least one of:

analog components;

digital components;

neuromorphic computer components;

quantum computer components;

logical components;

components composed of other components; or lines of computer code.

20. The system of claim 11, wherein the circuits comprise at least one of:

parallel circuits;

sub-circuits; or circuits arranged in hierarchical structures.

21. A computer program product for automated circuit design, the computer program product comprising:

a computer-readable storage medium having program instructions embodied thereon to perform the steps of:

mapping a number of inputs to a number of desired outputs;

receiving a number of specified constraints;

determining a number of component specifications for circuit components necessary to achieve the desired outputs from the inputs within the specified constraints;

choosing a number of circuit components based on the component specifications to optimize achievement of the desired outputs from the inputs within the specified constraints; and arranging the chosen circuit components in a number of circuits based the component specifications to optimize achievement of the desired outputs.

22. The computer program product of claim 21, wherein the circuit components arranged in the circuit are chosen from a library of circuit components.

23. The computer program product of claim 22, further comprising instructions for, responsive to a determination that the library does not contain a preexisting circuit component that matches one of the component specifications:

designing a novel circuit component that satisfies the component specification; and adding the novel circuit component to the library.

24. The computer program product of claim 21, wherein the constraints comprise at least one of:

energy efficiency;

performance;

size, weight, and power (SWaP);

robustness to adversarial attacks;

number of components;

monetary costs of process or technology node, fabrication, and packaging; or operation in harsh environments.

25. The computer program product of claim 21, wherein the steps of determining the component specifications, choosing the circuit components, and arranging the circuit components in the circuit occur via at least one of:

reinforcement learning;

evolutionary algorithms; or game theory.

26. The computer program product of claim 25, wherein a reinforcement learning agent employs a reward function based on at least one of:

component specifications;

circuit performance;

component characteristics; or circuit characteristics.

27. The computer program product of claim 25, wherein learning is accelerated by at least one of:

transfer learning; or curriculum learning.

28. The computer program product of claim 21, further comprising instructions for:

creating multiple circuits; and combining the circuits into a system that optimizes achievement of the desired outputs from the inputs within the specified constraints.

29. The computer program product of claim 21, wherein the circuit components comprise at least one of:

analog components;

digital components;

neuromorphic computer components;

quantum computer components;

logical components;

components composed of other components; or lines of computer code.

30. The computer program product of claim 21, wherein the circuits comprise at least one of:

parallel circuits;

sub-circuits; or circuits arranged in hierarchical structures.

* * * * *